US008649565B1

(12) United States Patent
Kim et al.

(10) Patent No.: US 8,649,565 B1
(45) Date of Patent: Feb. 11, 2014

(54) SYSTEM FOR AUTOMATIC OBJECT LOCALIZATION BASED ON VISUAL SIMULTANEOUS LOCALIZATION AND MAPPING (SLAM) AND COGNITIVE SWARM RECOGNITION

(75) Inventors: Kyungnam Kim, Newbury Park, CA (US); Michael Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 296 days.

(21) Appl. No.: 12/821,063

(22) Filed: Jun. 22, 2010

Related U.S. Application Data (63) Continuation-in-part of application No. 12/456,558, filed on Jun. 18, 2009.

(51) Int. Cl.
*G06K 9/00* (2006.01)
*G01C 21/00* (2006.01)

(52) U.S. Cl.
USPC .......................................... 382/106; 701/213

(58) Field of Classification Search
USPC ......... 340/995.1; 342/145; 382/106; 700/253
See application file for complete search history.

(56) References Cited

U.S. PATENT DOCUMENTS

| | | | |
|---|---|---|---|
| 6,178,141 B1 | 1/2001 | Duckworth et al. | |
| 6,621,764 B1 | 9/2003 | Smith | |
| 7,046,187 B2 | 5/2006 | Fullerton et al. | |
| 7,066,427 B2 | 6/2006 | Chang | |
| 7,104,496 B2 | 9/2006 | Chang | |
| 7,135,992 B2 | 11/2006 | Karlsson et al. | |
| 7,139,222 B1 | 11/2006 | Baxter et al. | |
| 7,151,478 B1 | 12/2006 | Adams et al. | |
| 7,190,633 B2 | 3/2007 | Brinn et al. | |
| 7,266,045 B2 | 9/2007 | Baxter et al. | |
| 7,292,501 B2 | 11/2007 | Barger | |
| 7,359,285 B2 | 4/2008 | Barger et al. | |
| 7,408,840 B2 | 8/2008 | Barger et al. | |
| 7,586,812 B2 | 9/2009 | Baxter et al. | |
| 7,599,252 B2 | 10/2009 | Showen et al. | |
| 2004/0158355 A1* | 8/2004 | Holmqvist et al. | 700/245 |
| 2005/0182518 A1* | 8/2005 | Karlsson | 700/253 |
| 2005/0238200 A1 | 10/2005 | Gupta et al. | |

(Continued)

OTHER PUBLICATIONS

Mayank et al ("Vision-based perception for autonomous urban navigation", IEEE, Conference on Intelligent Transportation Systems Beijing, China, Oct. 12-15, 2008, pp. 434-440).*

(Continued)

*Primary Examiner* — Amara Abdi
(74) *Attorney, Agent, or Firm* — Tope-McKay & Associates (57) ABSTRACT

Described is a system for automatic object localization based on visual simultaneous localization and mapping (SLAM) and cognitive swarm recognition. The system is configured to detect a set of location data corresponding to a current location of a sensor positioned on a platform. A map model of an environment surrounding the sensor is generated based on an input image from the sensor and the location data. In a desired aspect, a cognitive swarm object detection module is used to search for and detect an object of interest. The three-dimensional location of the object of interest relative to the platform is then estimated based on the map model and the location data regarding the sensor. The system described allows for real-time, continuous three-dimensional location updating for moving objects of interest from a mobile platform. A computer-implemented method and computer program product are also described.

17 Claims, 5 Drawing Sheets

(56) References Cited

U.S. PATENT DOCUMENTS

| | | | |
|---|---|---|---|
| 2007/0090973 A1 | 4/2007 | Karlsson et al. | |
| 2008/0027591 A1* | 1/2008 | Lenser et al. | 701/2 |
| 2008/0033645 A1* | 2/2008 | Levinson et al. | 701/213 |
| 2008/0247672 A1* | 10/2008 | Kaplinsky et al. | 382/300 |
| 2009/0096790 A1* | 4/2009 | Wiedemann et al. | 345/427 |
| 2009/0290019 A1 | 11/2009 | McNeilis et al. | |

OTHER PUBLICATIONS

Kennedy, J., Eberhart, R.C., and Shi, Y., "Swarm Intelligence," San Francisco: Morgan Kaufmann Publishers, 2001, chapter 7, pp. 287-326.

Kennedy, J., Eberhart, R.C., and Shi, Y., "Swarm Intelligence," San Francisco: Morgan Kaufmann Publishers, 2001, chapter 8, pp. 327-369.

R.C. Eberhart and Y. Shi, "Particle Swarm Optimization: Developments, Applications, and Resources," Proc. IEEE congress on evolutionary computation, CEC 2001, Seoul, Korea.

S. A. Holmes, G. Klein and D. W. Murray, "An O(N2) Square Root Unscented Kalman filter for Visual Simultaneous Localization and Mapping", IEEE Transactions on Pattern Analysis and Machine Intelligence, Jul. 2009.

Thomas Lemaire, Cyrille Berger, Il-Kyun Jung and Simon Lacroix, "Vision-Based SLAM: Stereo and Monocular Approaches", International Journal of Computer Vision, Sep. 2007.

M. Kaess and F. Dellaert, "Probabilistic Structure Matching for Visual SLAM with a Multi-Camera Rig", Computer Vision and Image Understanding, vol. 114, Feb. 2010, pp. 286-296.

Georg Klein and David Murray, "Parallel Tracking and Mapping for Small AR Workspaces", In Proc. International Symposium on Mixed and Augmented Reality 2007.

WeaponWatch by Radiance Technologies; first date of publication Sep. 27, 2007; http://www.radiancetech.com/products/weaponwatch.htm.

Robot Enhanced Detection Outpost with Lasers (REDOWL) by iRobot Corporation; first date of publication Oct. 3, 2005; http://www.irobot.com/sp.cfm?pageid=86&id=170.

* cited by examiner

SYSTEM FOR AUTOMATIC OBJECT LOCALIZATION BASED ON VISUAL SIMULTANEOUS LOCALIZATION AND MAPPING (SLAM) AND COGNITIVE SWARM RECOGNITION

PRIORITY CLAIM

This is a Continuation-in-Part Application of U.S. patent Ser. No. 12/456,558, filed Jun. 18, 2009, entitled, "Multi-Stage Method for Object Detection Using Cognitive Swarms and System for Automated Response to Detected Objects."

BACKGROUND OF THE INVENTION (1) Field of Invention

The present invention relates to a system for automatic object localization and, more particularly, to a system for automatic object localization using simultaneous localization and mapping (SLAM) and cognitive swarm recognition.

(2) Description of Related Art

Object localization is a technique that can be used to identify the location of a particular object. Detection of objects of interest in an unknown environment is often performed manually. For example, in military applications, soldiers must visually spot the locations of the objects of interest (e.g., potential threats).

Some products and prototype systems exist for detecting and defending against potential threats, but only after the threatened act has occurred (e.g., a weapon firing). Such existing systems include "Boomerang II" by BBN Technologies, which is located at 10 Moulon Street, Cambridge, Mass. 02138; "Crosshairs" by the Defense Advanced Research Projects Agency (DARPA), which is located at 3701 North Fairfax Drive, Arlington, Va. 22203; "WeaponWatch" by Radiance Technologies, located at 350 Wynn Drive, Huntsville, Ala. 35805; "Robot Enhanced Detection Outpost with Lasers (REDOWL)" by iRobot Corporation, located at 8 Crosby Drive, Bedford, Mass. 01730; "PDCue Tetrahedral Gunfire Detection System" by AAI Corporation, located at 124 Industry Lane, Hunt Valley, Md. 21030; "Anti-Sniper Infrared Targeting System (ASITS)" by M2 Technologies, Inc., which is located at 945 Concord Street Suite 217/218, Framingham, Mass. 01701; and "ShotSpotter" by ShotSpotter, Inc., located at 1060 Terra Bella Avenue, Mountain View, Calif. 94043.

Each of the systems described above use post-threat localization techniques. Additionally, the systems described do not provide pose detection (e.g., aiming, partially occluded, kneeling) of a potential threat, which is essential in accurate threat detection. Most existing systems depend on acoustic sensing for fire detection, while a few use image-based approaches with infrared (IR) sensors.

Particle swarm optimization (PSO) is a technique that can be applied to object recognition. PSO was first described by Kennedy, J., Eberhart, R. C., and Shi, Y. in "Swarm Intelligence," San Francisco: Morgan Kaufmann Publishers, 2001. PSO was also described by R. C. Eberhart and Y. Shi in "Particle Swarm Optimization: Developments, Applications, and Resources," 2001, which is incorporated by reference as though fully set forth herein. Cognitive swarms are a new variation and extension of PSO. Cognitive swarms search for and recognize objects by combining PSO with an objective function that is based on the recognition confidence.

Simultaneous localization and mapping (SLAM) is a technique used to generate a map within an unknown environment (or a known environment). While generating the map, SLAM enables predicting and updating of the current location of the moving device (e.g., robot, autonomous vehicle) by discerning the device's relative movement from a set of sensors. While the SLAM technique has been actively used for autonomous navigation, augmented reality, and vision-guided robotics, the technique has not been applied to object localization.

Thus, a continuing need exists for a system which combines efficient object recognition with an environmental mapping capability to provide rapid and accurate object localization.

SUMMARY OF THE INVENTION

The present invention relates to a system for automatic object localization comprising one or more processors that are operable for performing operations necessary for object localization.

First, a set of location data is detected, wherein the location data corresponds to a current location of at least one sensor positioned on a platform. Input is then received from the at least one sensor, resulting in an input image. A map model of an environment surrounding the at least one sensor is generated based on the input image and the location data. An object detection module detects and classifies an object of interest in the input image. Finally, a three-dimensional location of the object of interest relative to the platform based on the map model and the location data of the at least one sensor is estimated.

In another aspect, in the act of generating a map model, the system is further configured to perform operations of extracting a set of feature points from the input image, storing the set of feature points in a map database, comparing the set of feature points extracted from the input image with a set of feature points extracted from a previous image, and updating the map model continuously, such that the locations of matching feature points between the input image and the previous image are updated in the map model.

In another aspect, the system is further configured to estimate a three-dimensional location of the object of interest while the platform and the object are moving and continuously update the estimated location of the object of interest in real-time by detecting and tracking a set of feature points representing the object of interest.

In yet another aspect the system further comprises multiple sensors positioned on the platform, wherein the multiple sensors are positioned such that a 360 degree view of the environment is obtained.

In another aspect, the system is further configured to continuously update a six degree-of-freedom location and pose of the platform in the map model.

In another aspect, the system further comprises a computation platform using parallelized computing for real-time processing on multiple sensors.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform said operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for automatic object localization and, more particularly, to a system for automatic object localization using simultaneous localization and mapping (SLAM) and cognitive swarm recognition. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for automatic object localization. The system is typically in the form of a computer system, computer component, or computer network operating software or in the form of a "hard-coded" instruction set. This system may take a variety of forms with a variety of hardware devices and may include computer networks, handheld computing devices, such as cell phones and personal digital assistant (PDA), cellular networks, satellite networks, and other communication devices. As can be appreciated by one skilled in the art, this system may be incorporated into a wide variety of devices that provide different functionalities. The second principal aspect is a method for automatic object localization, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), random access memory, and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Introduction

As stated above, the invention described herein relates to a system for automatic object localization using cognitive swarm recognition and simultaneous localization and mapping (SLAM). Cognitive swarm recognition is a recognition technique based on particle swarm optimization (PSO).

PSO is a relatively simple optimization method that has its roots in artificial life in general, and to bird flocking and swarming theory in particular. Conceptually, it includes aspects of genetic algorithms and evolutionary programming. A population of potential solutions is maintained as the positions of a set of particles in a solution space where each dimension represents one solution component. Each particle is assigned a velocity vector and the particles then explore cooperatively the solution space in search of the objective function optima. Each particle keeps track of its coordinates in multi-dimensional space that are associated with the best solution (p) it has observed so far. A global best parameter ($p_g$) is used to store the best location among all particles. The velocity of each particle is then changed towards p and $p_g$ in a probabilistic way according to:

$$v_i(t+1) = wv_i(t) + c_1\phi_1[p_i(t) - x_i(t)] + c_2\phi_2[p_g(t) - x_i(t)]$$

$$x_i(t+1) = x_i(t) + \chi v_i(t+1)$$

where $x_i(t)$ and $v_i(t)$ are the position and velocity vectors at time t of the i-th particle and $c_1$ and $c_2$ are parameters that weight the influence of their respective terms in the velocity update equation, w is a decay constant which allows the swarm to converge to a solution more quickly, $\phi 1$ and $\phi 2$ are random numbers between 0 and 1 that introduce a degree of random exploration, and $\chi$ is a parameter that controls the convergence properties of the swarm.

The above PSO dynamics reflect a socio-psychological model where individual particles change their beliefs in accordance with a combination of their own experience and the best experience of the group. This is in contrast to other models of cognition where an individual changes his beliefs to become more consistent with his own experience only. The random element introduces a source of noise which enables an initial random search of the solution space. The search then becomes more directed after a few iterations as the swarm starts to concentrate on more favorable regions. This type of search is much more efficient than exhaustive or gradient based search methods. PSO relies on the fact that in most practical problems the optimum solution usually has better than average solutions residing in a volume around it. These good solutions tend to attract the particles to the region where the optimum lies. The swarm becomes more and more concentrated until the optimum is found (e.g., $p_g$ no longer changes). In cognitive swarms, the PSO objective function is the confidence level of an object classifier. The cognitive swarm locates objects of interest in the scene by maximizing the classifier confidence.

As such, in a desired aspect, the system described herein enables object localization from a platform using visual simultaneous localization and mapping (SLAM) in conjunction with efficient search in real-time processing using cognitive swarm recognition technology. Furthermore, in contrast to traditional SLAM techniques which focus on stationary landmarks, the present invention allows continuous three-dimensional location updating for moving objects as well. Additionally, the approach utilizes continuous prediction and update of the platform's state (e.g., six degree-of-freedom location and pose), the surrounding environment, and the object of interest.

As can be appreciated by one skilled in the art, the present invention can be applied to a variety of systems in which object localization is desirable. As a non-limiting example, the SLAM-based method of the present invention enables a vehicle-mounted system to move through known and unknown environments to detect objects of interest while moving. In a desired aspect, continuous 360° full-situational awareness for possible objects of interest can be realized with multiple sensors (e.g., cameras) and/or 360° optics. Deployable omnidirectional visual surveillance systems for object localization can be built though multi-camera fusion and modular design.

Thus, the present invention improves upon the prior art by providing a system for automatically and geometrically localizing an object (e.g., human, vehicle) and its orientation relative to a platform (e.g., moving vehicle).

(3) Specific Details

Figure 1:
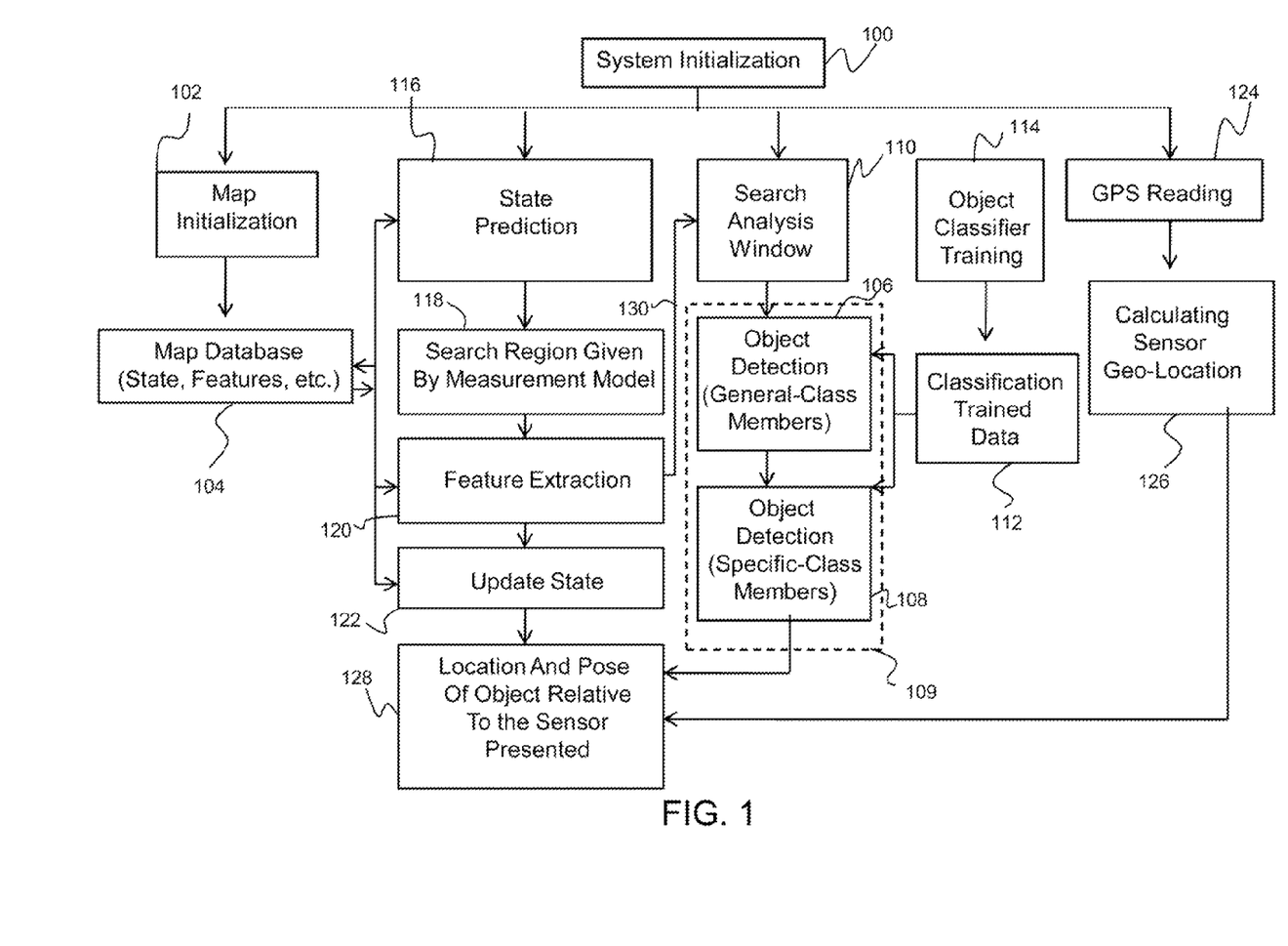
FIG. 1 is a flow diagram depicting a method for automatic object localization according to the present invention.

FIG. 1 is a flow diagram illustrating a process flow of the system for automatic object localization according to the present invention. First, the system is initialized 100 with a set of known feature points (e.g., landmarks) and their estimated depths from a sensor (e.g., camera) on a platform (e.g., vehicle) through map initialization 102 of feature points stored in a map database 104. Thus, map initialization 102 initializes the values of the state and features. The map database 104 is a collection of variables which are updated by the system processes (e.g., state prediction, feature extraction, update state).

The sensor provides the ability to measure the orientation and distance of an object of interest (e.g., human) in a real-world scale, which will be described in more detail below. All of the feature points detected in a two-dimensional image have uncertain depths. The set of known feature points provide the initial scale and depth of an unknown environment.

The origin of the world coordinate is initialized by the map initialization 102. The map database 104 stores the platform's state (location/pose of the platform in the world coordinate) and surrounding three-dimensional feature points.

The system is further configured to automatically detect an object of interest from input images obtained from the sensor (e.g., camera). As illustrated in FIG. 1, object detection occurs through a first stage 106 and a second stage 108 of an object detection module 109. In a desired aspect, the object detection module 109 is a cognitive swarm detection module. However, as can be appreciated by one skilled in the art, the object detection module 109 could by any suitable object detection module 109, a non-limiting example of which includes a Histograms of Oriented Gradients (HOG) detector.

The conventional processing flow for recognition of objects in images or video consists of defining and searching an analysis window 110, which is a selected portion of an image to be analyzed for the presence or absence of an object of interest. The analysis window is scanned or otherwise positioned at various locations in the image in order to find objects. Feature points are then extracted from the analysis window that in some way are descriptive of the object of interest. A common type of feature is the inner-product of the analysis window with a two-dimensional (2-D) kernel function. A set of feature values from different locations in the analysis window, each of which may use a different kernel function, are combined into a feature vector.

Feature extraction and feature value calculation can be implemented using various types of features known in the art, non-limiting examples of which include Generalized Haar-like Wavelet Features. As understood by one skilled in the art, the appropriate feature set to use for a given object will largely depend on the type of object being detected. Non-limiting examples of such feature sets include histograms of edge orientation, texture, shape, and intensity. Finally, the feature vector is classified as representing an object of interest or non-object of interest based on classification trained data 112 obtained from object classifier training 114, which is based on exceeding a predetermined threshold. For instance, the classification trained data 112 may be trained using a single classifier. Alternatively, the classification trained data 112 may be trained using a cascade of classifiers to achieve higher accuracy and speed. In a desired aspect, the classifier for object detection used in the system employs a unique, fast, descriptive, automatically-selected, non-notion-based feature set consisting of low false alarm cascaded sub-classifiers, a non-limiting example of which includes real-time cognitive swarm recognition for rapid visual search with integrated attention mechanisms.

The system is further configured to initially search for members of a predetermined general-class of objects with the first stage 106 of the object detection module 109. When a member of the general-class of objects is found, the portion of the image containing the general-class member is sent to the second stage 108 of the object detection module 109, where the image portion is further searched for members of a pre-determined specific-class of objects. It should be noted that additional search stages may be used if greater search specificity is required.

Compared to conventional methods, the two-stage object detection method described above, and in detail in U.S. patent application Ser. No. 12/456,558 titled, "Multi-Stage Method for Object Detection Using Cognitive Swarms and System for Automated Response to Detected Objects," provides much faster object detection capabilities, as well as the ability to detect an object based on the context of its surroundings. For example, the system is capable of detecting the pose of a person (i.e., general-class member) holding a small object (i.e., specific-class member) when the object itself is too small to be detected directly. In a desired aspect, the general-class of objects is a human, and the specific-class of objects is humans in a specific pose (e.g., kneeling)

The specific object detection system is implemented using cognitive swarms, which is based on Particle Swarm Optimization (PSO). The details of the cognitive swarm framework are disclosed in U.S. Pat. No. 7,599,894 entitled "Cognitive Swarm Vision Framework with Attention Mechanisms," and U.S. patent application Ser. No. 12/456,558 titled, "Multi-Stage Method for Object Detection Using Cognitive Swarms and System for Automated Response to Detected Objects," both of which are hereby incorporated by reference as though fully set forth herein.

The SLAM technique in the present invention is used to generate a map within an environment while simultaneously predicting and updating the current location and pose of a moving platform (e.g., vehicle, camera) by discerning the platform's relative movement from a set of sensors. In the present invention, the first step in the SLAM process is state prediction 116 which involves predicting the state (i.e., location and/or pose) of the platform. Since the camera is attached to the platform, the states of the camera and the platform are the same (or differ by a constant translation). Thus, the state of the platform is predicted by a motion model, a non-limiting example of which includes a constant velocity motion model.

The next step in the process is a search of previously detected feature points in a region of a current frame of an image obtained by the sensors for a matching region based on a measurement model 118. The detection of feature points will be described in further detail below. The measurement model comprises measurements related to the state of the platform by camera parameters and perspective projection. As a non-limiting example, the feature matching is carried out using a straightforward normalized cross-correlation search for the measurement model region projected by the current camera perspective projection.

The SLAM process continues with feature extraction 120. As described above, the map database 104 representing a surrounding area consists of a set of feature points (or three-dimensional locations), which represent visually outstanding stationary landmarks of the surroundings. The feature points are represented by local descriptors used to determine the association between the landmarks. Feature points are extracted (or measured) from an image frame by a feature detection algorithm, non-limiting examples of which includes Scale-Invariant Feature Transform (SIFT), Speeded Up Robust Features (SURF) feature detectors, Shi-Tomasi tracker, or corner detection. The feature points are detected and tracked over time. Although not limited thereto, the SLAM process of the system described herein runs at approximately five frames per second (fps).

As shown in FIG. 1, the first stage 106 and second stage 108 of the object detection module 109 run in parallel with the SLAM process. Once an object is detected in a two-dimensional image through PSO dynamics as described above, its orientation and distance from the platform (i.e., camera/vehicle) are estimated using the feature points extracted through feature extraction 120 corresponding to the object region. If feature points in the detected region are not available, then neighboring feature points are used. Again, although not limited thereto, in operation, the object detection module 109 using cognitive swarm optimization runs at approximately five fps.

During an update of the state 122 of the platform, the map of feature points is updated continuously by matching the feature points between the current frame of an image with the feature points in a previous frame while the camera is in motion. By comparing features points between the input image and the previous image, the feature points that matched well will be updated in terms of their location and location uncertainty (variance). Non-matched points are added to the map database 104 as new feature points.

When the camera is moving, new feature points become visible while others disappear from view. New feature points are added and initialized with unknown depths. Feature points which have disappeared are deleted from the map database 104 or stored for future reappearance when returning to the location. Data (e.g., feature points, state) stored in the map database 104 is utilized in each of the steps in the SLAM process. Likewise, data obtained during the steps of the SLAM process is stored in the map database 104.

With respect to the world coordinate system, the vehicle (or sensor) can be localized based on a GPS reading 124. The GPS is used to geo-locate the vehicle (or the camera). Using the GPS reading 124, the geo-location of the sensor is calculated 126. Finally, given the geo-location of the sensor and a detected object of interest with extracted feature points, the location and pose of the detected object relative to the sensor is presented 128. Using the GPS reading 124, the object's relative location can be converted to a geo-coordinate. Therefore, the system described herein provides for real-time, continuous three-dimensional location updating for moving objects while the platform is moving, compared with traditional SLAM which focuses on stationary landmarks.

Furthermore, the localization information can improve the performance of the first stage 106 and second stage 108 of the object detection module 109. For instance, the feature point locations obtained by the SLAM process can provide feedback 130 to refine the analysis window being searched 110 for an object of interest resulting in computation time reduction. The tracked object location can be appended to the map database 104 as a special feature point. The localization accuracy depends on the uncertainties related to the platform's state and visual tracking of feature points.

As described above, the system state is continuously predicted and updated using the SLAM technique. In a desired aspect, the system's state includes the platform's (e.g., vehicle, camera) six-degree-of-freedom (DOF) information including position and orientation, velocity, and feature points. Six DOF refers to motion of a rigid body in three-dimensional space, thus the ability to move forward and backward, up and down, and left and right combined with rotation about three perpendicular axes (e.g., pitch, yaw, and roll).

Figure 2:
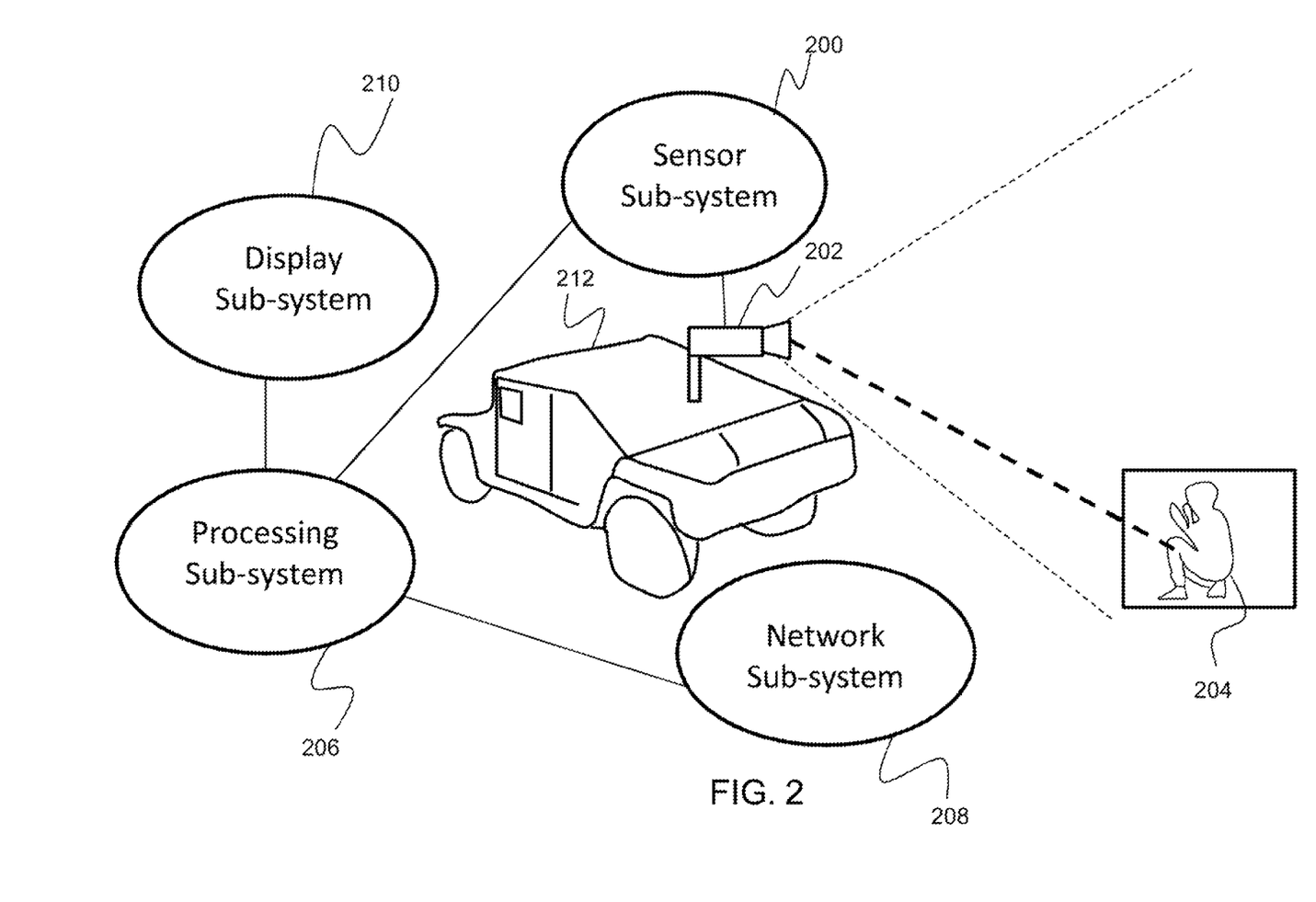
FIG. 2 is an illustration showing the various subsystems of a system for automatic object localization according to the present invention.

FIG. 2 depicts an implementation of the system for automatic object localization according to the present invention. A sensor subsystem 200 consists of sensors 202 (e.g., cameras) used to detect an object of interest 204. The sensor subsystem 200 could consist of a single optical sensor 202, or an array of multiple sensors. One possible array of cameras is an array of six cameras, each with a 60 degree field-of-view, to provide full coverage across 360 degrees. If needed, a wide angle lens can be used to increase the object detection coverage. The images sensed by the sensors 202 are fed into a processing subsystem 206, where PSO dynamics are used to detect and identify objects of interest 204 as described above. If multiple sensors 202 are used, the system will also require a network sub-system 208 consisting of an array of multiple computers processing the camera images in parallel. The network sub-system 208 can be connected with a master processor for coordinating results from the network of data processors.

When objects of interest 204 are detected, their locations are sent to an output sub-system (i.e., the display sub-system 210). Once an object of interest 204 is detected, the system can inform the operators of the location of the detected object. As a non-limiting example, once an object of interest 204 is detected, the system can inform a human operator to direct the change of a vehicle's direction in response to the detected object. Efficient communication also allows active cooperation with other vehicles.

The location information must be presented so it is intuitively and rapidly perceived with minimal cognitive effort. This can be a difficult task in situations where the system is mounted on a rapidly moving vehicle 212. Typical existing methods of presenting relative location information through synthesized speech will be invalid the moment the vehicle changes direction or even continues forward for a significant distance. Instead, a graphical display method that continuously updates the location of the object of interest 304 relative to the rapidly moving vehicle 212 is required. As non-limiting examples, the object of interest 204 information may be displayed on a head-down display or on a small flat panel display, such as a personal digital assistant (PDA). These displays can be continuously updated for use in situations where an operator is continuously changing position or orientation.

In order to increase the processing speed of object localization and to be extendible to a multi-sensor system, computation performance needs to be enhanced via newly emerging software/hardware platforms of highly parallelized computation. Non-limiting examples of computation platforms include a single-core central processing unit (CPU), multi-core CPU, graphics processing unit (GPU), and field-programmable gate array.

Figure 3:
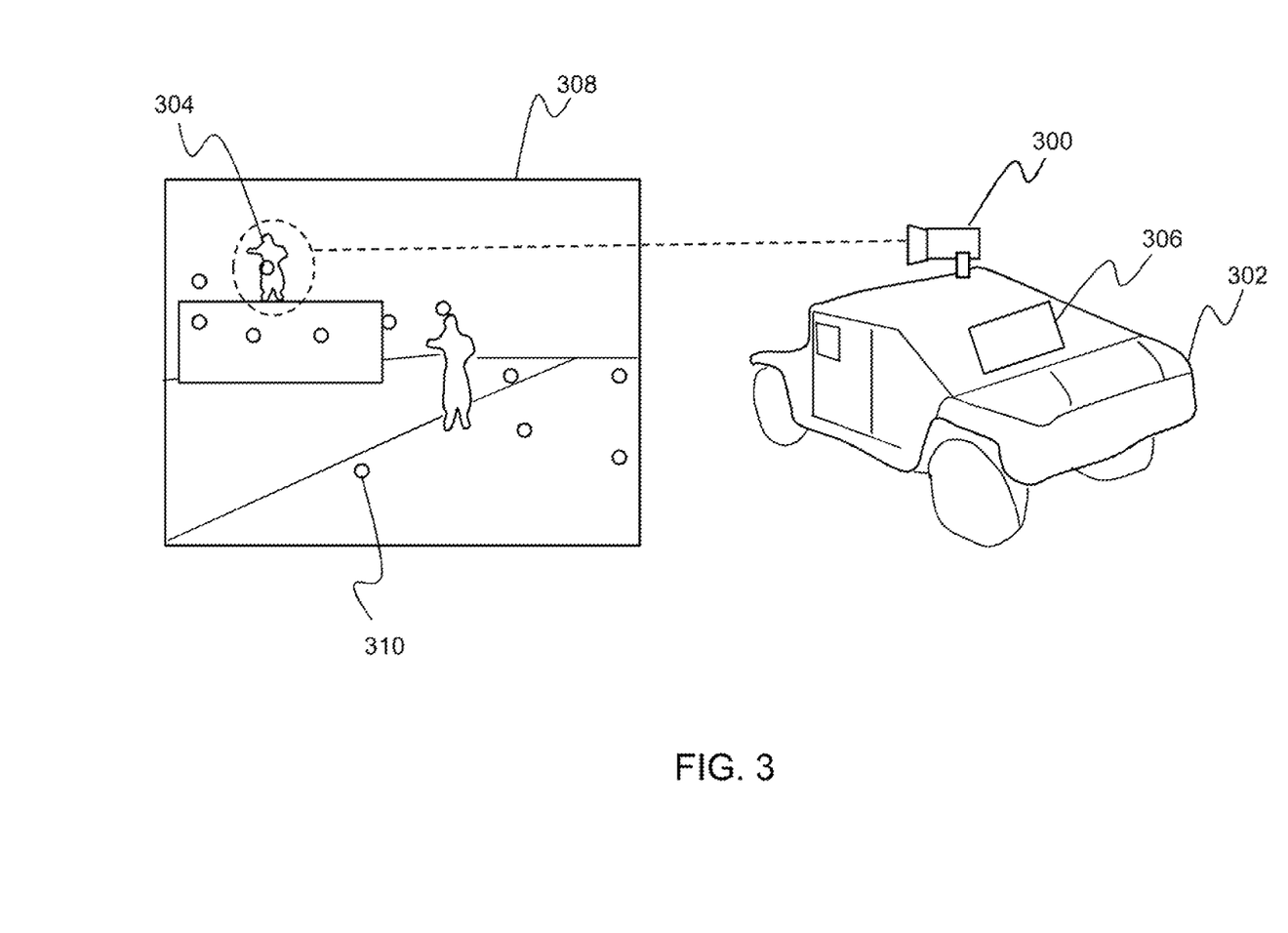
FIG. 3 illustrates an example scenario in which a system for automatic object localization according to the present invention can be applied.

An example of automatic object localization from a platform (e.g., vehicle) is illustrated in FIG. 3. As a non-limiting example, a visual sensor 300 (e.g., digital camera with a CCD imager, CMOS imager, infrared imager) is mounted on the roof-top of a vehicle 302. While the system is depicted with a single sensor 300 in FIG. 3, multiple sensors 300 can be installed on the vehicle 302 for full-situation awareness, since each sensor 300 (e.g., camera) can work independently. The sensor 300 provides the ability to measure the orientation and distance of an object 304 (e.g., human) in a real-world scale. A global positioning system (GPS) 306 is also positioned on the vehicle 302 with a pre-calculated three-dimensional (x-y-z) offset from the sensor 300 coordinate system, which is pre-defined in the sensor's 300 system. The three-dimensional location of the platform (i.e., camera and/or vehicle 302) in terms of the world coordinate can be measured by GPS 306 to provide geo-location information for the platform.

FIG. 3 further illustrates an image 308 obtained from the sensor 300 including at least one feature point 310. Given in feature points 310 in an image 308 obtained from the sensor 300 (where n≥1), the orientation of each feature point 310 relative to the sensor 300 coordinate system is determined from its location in the image 308. The distance can be initially set by a very large value (variance) and can be updated while new observations are made based on changes in the vehicle's 302 position (as the vehicle 302 moves) and/or changes in the object's 304 position (as the object 304 moves). Initially, the sensor 300 coordinate can be used as the initial world coordinate system for simplicity.

Figure 4:
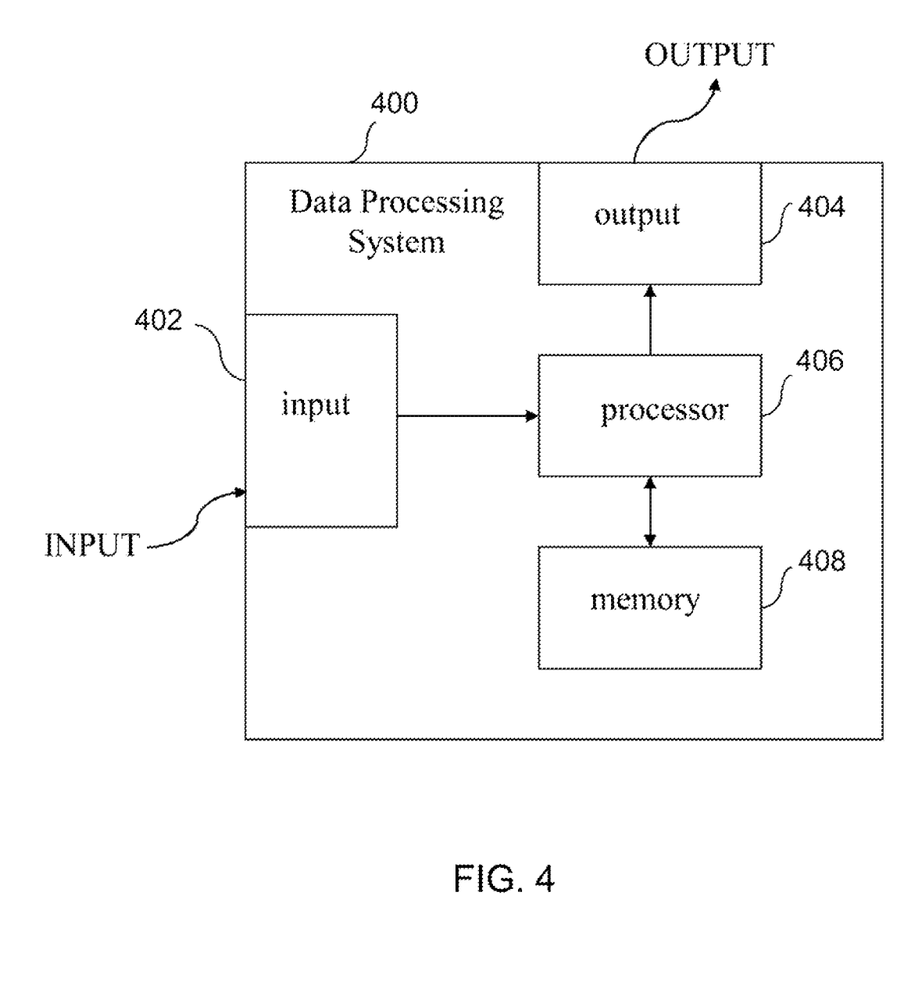
FIG. 4 is an illustration of a data processing system according to the present invention.

FIG. 4 illustrates a block diagram depicting components of a data processing system 400 (e.g., computer) incorporating the operations of the method described above. The method utilizes a data processing system 400 for storing computer executable instructions for causing a processor to carry out the operations of the above described method. The data processing system 400 comprises an input 402 for receiving information from a user and/or sensors or other systems/subsystems described herein. Information received may include input from devices such as cameras, scanners, keypads, keyboards, microphone, other peripherals such as storage devices, other programs, etc. The input 402 may include multiple "ports." An output 404 is connected with a processor 406 for providing information for transmission to other data processing systems, to storage devices, to display devices such as monitors, to generating information necessary for delivery, and to other mechanisms for presentation in user-usable forms. The input 402 and the output 404 are both coupled with the processor 406, which may be a general-purpose computer processor or a specialized processor designed specifically for use with the present invention. The processor 406 is coupled with a memory 408 to permit storage of data and software to be manipulated by commands to the processor 406.

Figure 5:
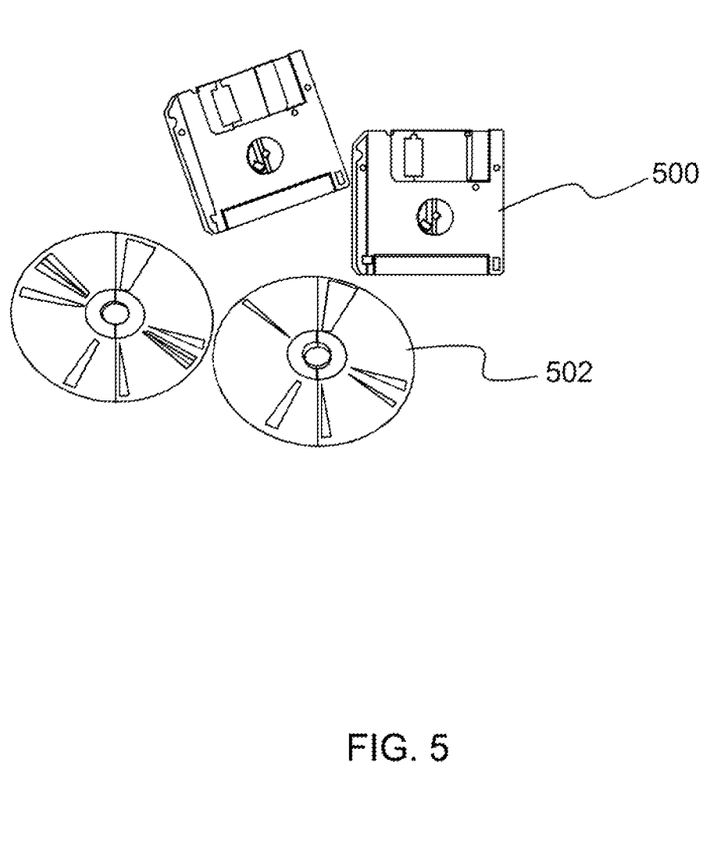
FIG. 5 is an illustration of a computer program product according to the present invention.

An illustrative diagram of a computer program product embodying the present invention is depicted in FIG. 5. As a non-limiting example, the computer program product is depicted as either a floppy disk 500 or an optical disk 502. However, as mentioned previously, the computer program product generally represents computer readable code (i.e., computer readable code) stored on any compatible computer readable medium.

What is claimed is:

1. A system for automatic object localization, the system comprising one or more processors configured to perform operations of:
    detecting a set of three-dimensional location data, wherein the three-dimensional location data corresponds to a current location of at least one sensor positioned on a platform;
    receiving input from the at least one sensor, resulting in an input image;
    generating a map model of an environment surrounding the at least one sensor based on the input image and the three-dimensional location data;
    detecting and classifying an object of interest in the input image using a cognitive swarm detection module;
    estimating a three-dimensional location of the object of interest relative to the platform based on the map model and the three-dimensional location data of the at least one sensor using a localization module;
    estimating a pose of the object of interest relative to the platform based on the map model and the three-dimensional location data of the at least on sensor using the localization module;
    providing the three-dimensional location data from the localization module as feedback to the cognitive swarm detection module to refine the input image;
    wherein the system is further configured to estimate the three-dimensional location and pose of the object of interest while the platform and the object of interest are moving, and continuously update the estimated location of the object of interest in the map model in real-time; and
    wherein the cognitive swarm detection module runs in parallel with the localization module for real-time processing.

2. The system for automatic object localization as set forth in claim 1, wherein in the act of generating a map model, the system is further configured to perform operations of:
    extracting a set of feature points from the input image;
    storing the set of feature points in a map database;

comparing the set of feature points extracted from the input image with a set of feature points extracted from a previous image; and updating the map model continuously, such that the locations of matching feature points between the input image and the previous image are updated in the map model.

3. The system for automatic object localization as set forth in claim 2, wherein the system is further configured to detect and track a set of feature points representing the object of interest.

4. The system for automatic object localization as set forth in claim 1, further comprising multiple sensors positioned on the platform, wherein the multiple sensors are positioned such that a 360 degree view of the environment is obtained.

5. The system for automatic object localization as set forth in claim 1, wherein the system is further configured to continuously update a six degree-of-freedom location and pose of the platform in the map model.

6. The system for automatic object localization as set forth in claim 1, further comprising a computation platform using parallelized computing for real-time processing on multiple sensors.

7. A computer-implemented method for automatic object localization, the method comprising an act of causing a processor to perform operations of:

detecting a set of three-dimensional location data, wherein the three-dimensional location data corresponds to a current location of at least one sensor positioned on a platform;

receiving input from the at least one sensor, resulting in an input image;

generating a map model of an environment surrounding the at least one sensor based on the input image and the three-dimensional location data;

detecting and classifying an object of interest in the input image using a cognitive swarm detection module;

estimating a three-dimensional location of the object of interest relative to the platform based on the map model and the three-dimensional location data of the at least one sensor using a localization module;

estimating a pose of the object of interest relative to the platform based on the map model and the three-dimensional location data of the at least on sensor using the localization module;

providing the three-dimensional location data from the localization module as feedback to the cognitive swarm detection module to refine the input image;

wherein the system is further configured to estimate the three-dimensional location and pose of the object of interest while the platform and the object of interest are moving, and continuously update the estimated location of the object of interest in the map model in real-time; and wherein the cognitive swarm detection module runs in parallel with the localization module for real-time processing.

8. The method for automatic object localization as set forth in claim 7, wherein in the act of generating a map model, the method further comprises acts of:

extracting a set of feature points from the input image;

storing the set of feature points in a map database; and comparing the set of feature points extracted from the input image with a set of feature points extracted from a previous image; and updating the map model continuously, such that the locations of matching feature points between the input image and the previous image are updated in the map model.

9. The method for automatic object localization as set forth in claim 8, further comprising an act of detecting and tracking a set of feature points representing the object of interest.

10. The method for automatic object localization as set forth in claim 7, further comprising an act of positioning multiple sensors on the platform, wherein the multiple sensors are positioned such that a 360 degree view of the environment is obtained.

11. The method for automatic object localization as set forth in claim 7, further comprising an act of continuously updating a six degree-of-freedom location and pose of the platform in the map model.

12. The method for automatic object localization as set forth in claim 7, further comprising an act of using parallelized computing of a computing platform for real-time processing on multiple sensors.

13. A computer program product for automatic object localization, the computer program product comprising non-transitory computer-readable instruction means stored on a computer-readable medium that are executable by a computer having a processor for causing the processor to perform operations of:

detecting a set of three-dimensional location data, wherein the three-dimensional location data corresponds to a current location of at least one sensor positioned on a platform;

receiving input from the at least one sensor, resulting in an input image;

generating a map model of an environment surrounding the at least one sensor based on the input image and the three-dimensional location data;

detecting and classifying an object of interest in the input image using a cognitive swarm detection module;

estimating a three-dimensional location of the object of interest relative to the platform based on the map model and the three-dimensional location data of the at least one sensor using a localization module;

estimating a pose of the object of interest relative to the platform based on the may model and the three-dimensional location data of the at least on sensor using the localization module;

providing the three-dimensional location data from the localization module as feedback to the cognitive swarm detection module to refine the input image;

wherein the system is further configured to estimate the three-dimensional location and pose of the object of interest while the platform and the object of interest are moving, and continuously update the estimated location of the object of interest in the map model in real-time; and wherein the cognitive swarm detection module runs in parallel with the localization module for real-time processing.

14. The computer program product for automatic object localization as set forth in claim 13, wherein in the act of generating a map model, further comprising instruction means for causing the processor to perform operations of:

extracting a set of feature points from the input image;

storing the set of feature points in a map database; and comparing the set of feature points extracted from the input image with a set of feature points extracted from a previous image; and updating the map model continuously, such that the locations of matching feature points between the input image and the previous image are updated in the map model.

15. The computer program product for automatic object localization as set forth in claim 14, further comprising instruction means for detecting and tracking a set of feature points representing the object of interest.

16. The computer program product for automatic object localization as set forth in claim 13 further comprising instruction means for continuously updating a six degree-of-freedom location and pose of the platform in the map model.

17. The computer program product for automatic object localization as set forth in claim 13, further comprising instruction means for parallelized computing of a computing platform for real-time processing on multiple sensors.

* * * * *